Sept. 14, 1948.                    R. BOUCHER                    2,449,200
                          BICYCLE REAR LIGHT CONTROL
                            Filed Nov. 28, 1947
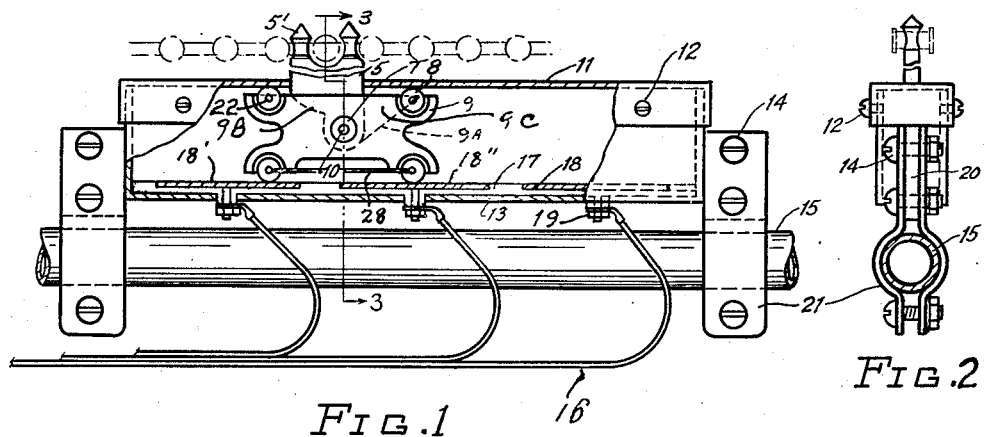
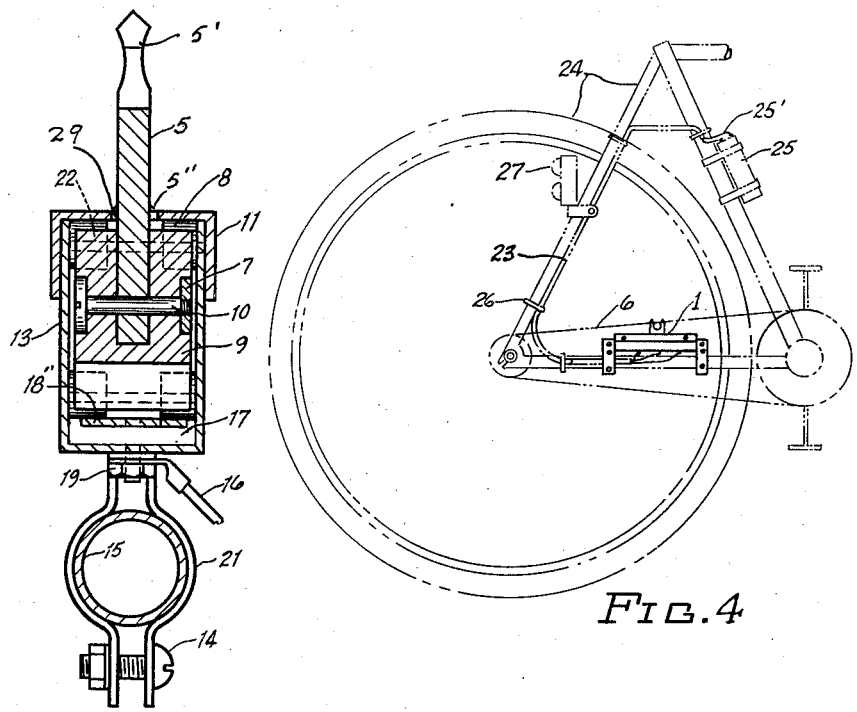
Roger Boucher
Inventor Patented Sept. 14, 1948

2,449,200

UNITED STATES PATENT OFFICE 2,449,200

BICYCLE REAR LIGHT CONTROL

Roger Boucher, Hull, Quebec, Canada

Application November 28, 1947, Serial No. 788,729
In Canada November 17, 1947

3 Claims. (Cl. 315—77)

My invention relates to the arrangement of parts by which green and red lights can be put on or out at the rear of a bicycle.

Devices of the nature of my invention have been made and tried, but I believe that my arrangement of putting bicycle rear lights on and out, is more practicable, cheaper of installation and more dependable than the like systems now in use.

The low cost of manufacture and installation of my device together with its dependability, are the main objects in view, and I attain these objects by the mechanism illustrated in the accompanying drawings.

Briefly, my invention comprises a housing 13 secured to one of the lower horizontal bars of the frame of a bicycle and a carriage body 9 made to be driven therein. The carriage, made of non-conducting material, is designed to move back and forth on rollers 22. A partly rotating dog 5 is made to pivot on pin 10 secured to the side walls of the carriage and provided with teeth made to engage the links of the driving chain 6 of the bicycle. Circuit contact plates 18, 18' and 18" are provided within the housing establishing communication between battery 25 and lights 27.

In the drawings:

Figure 1 is a side view of the mechanism mounted on bicycle looking to the right hand side thereof, and showing the interior of the housing.

Figure 2 shows an end view of mechanism mounted on the bicycle.

Figure 3 is a cross section through the housing on line 3—3 of Figure 1, and,

Figure 4 shows the arrangement and position of the housing, battery, tail lights and wiring harness on the bicycle looking to the left hand side thereof.

Similar numerals refer to similar parts throughout the several views.

I will now proceed to describe the invention in detail.

By referring first to Figure 4, numeral 24 shows part of a bicycle frame and rear wheel, numeral 6 shows the bicycle driving chain, and 13 is the casing housing the lights controlling parts. Numeral 25 is an electric battery, and 25' is a switch to open and close the electric circuit. Numerals 23 and 26 designate wiring conduits and fastening clips respectively. Numeral 27 shows the position of the lights secured on one of the rear bars of the bicycle frame.

On bar 15 I secure a housing 13 by means of brackets 21 and lug 20 fastened in place by screws 14. Numeral 11 is a cover for the housing retained thereon by screws 12. In the cover 11 there is a slot 29 extending nearly the full length thereof and into which slides the dog 5. On each side of said slot I place a rubber band preventing water and dust from entering the housing.

At intervals on the bottom face of the housing, I place circuit contact plates 18, 18' and 18" in current communication with the circuit wires 16 through connectors 19 to which they are welded. In the housing also, there is a carriage 9 adapted to move back and forth on rollers 22 engaging said plates in the movements of said carriage.

As may be seen by referring to Figure 1, in the carriage there is formed a recess 9 (A) the bottom of which being made substantially circular and into which rotates the lower section of dog 5. One side of said recess is curved as shown at 9 (B), and the other side inclined at an angle of about 45 degrees as shown at 9 (C). The dog 5 rotates on pin 10 the latter being held on the side walls of the carriage and fastened thereto by nut 7.

It will be readily seen that the dog 5 may occupy two positions, a substantially vertical one as shown by Figure 1 when the dog abuts against curved section 9 (B) of said recess, and an inclined position when it is brought to rest against the inclined side 9 (C) of the recess.

In the upper section of the dog 5 I provide a number of teeth 5' made to engage the links of the bicycle driving chain 6.

Numeral 28 shows a wire connecting the lower front and rear wheels 22 of the carriage and establishing current communication between contact plate 18 and 18", and between plates 18 and 18' whether the carriage occupies a rearward or forward position in the housing.

Numeral 17 is an insulator insulating contact plates 18, 18' and 18" with the bottom of the housing.

My invention operates as follows:

When the bicycle is at rest or when the bicycle brakes are on and the switch 25 open, the carriage 13 and dog 5 occupy the position shown in Figure 1 and the red light is on. When the driver puts the bicycle in motion forward, the dog 5 being engaged in the driving chain will be thrown against the inclined rest 9 (C), and at the same time, the carriage will be shifted off the contact plate 18' and brought to contact plate 18 thereby cutting the current off the red light and putting the green light on. The green light will remain on so long as the driver will keep the bicycle moving ahead, the dog being then disengaged from the driving chain 6.

But, if the driver slows or stops the bicycle, the upper section of the chain immediately sags or droops enough to catch and engage the teeth of the dog and lift it up carrying the carriage off the green light plate and opening the current to the red light by coming in contact with plate 18.

I may add that there will be enough friction between the carriage wheels and the bottom and cover of the housing to prevent any movement of the carriage rearward in the housing while the bicycle is moving ahead and the teeth disengaged from the driving chain 6.

I am aware that prior to my invention, bicycles have been equipped with electric lights operated by a battery. I therefore do not claim such a combination broadly.

I claim:

1. In a bicycle rear light control, a housing secured to the frame of a bicycle circuit contact plates on the bottom of said housing, a carriage made of nonconducting material provided with upper and lower rollers and adapted to move back and forth on said plates in the housing, a bicycle driving chain, a longitudinal recess in said carriage and a dog adapted to partly rotate in a vertical plane therein, teeth formed on the outer extremity of said dog for engagement with said driving chain.

2. In a bicycle rear light control, a housing secured to the frame of a bicycle, circuit contact plates on the bottom of said housing, a carriage made of nonconducting material provided with upper and lower rollers and adapted to move back and forth on said plates in the housing, a bicycle driving chain, a longitudinal recess in said carriage and a dog adapted to partly rotate in a vertical plane therein, teeth on the outer extremity of said dog for engagement with said driving chain, wire connectors secured on the bottom of the housing and in permanent contact with said plates, a wire connecting the lower of said rollers thereby establishing communication between two of said plates, an electric battery and lights secured on the bicycle frame, and wires connecting said battery to said plates and to said lights.

3. In a bicycle rear light control, a housing secured to the frame of a bicycle, circuit contact plates on the bottom of said housing, a carriage made of nonconducting material provided with upper and lower rollers and adapted to move back and forth on said plates in the housing, a bicycle driving chain, a longitudinal recess in said carriage and a dog adapted to partly rotate in a vertical plane therein, teeth on the outer extremity of said dog for engagement with said driving chain, wire connectors secured on the bottom of the housing and in permanent contact with said plates, a wire connecting the lower of said rollers thereby establishing communication between two of said plates, an electric battery and lights secured on the bicycle frame, and wires connecting said battery to said plates and to said lights, an insulator between said contact plates and the bottom of the housing, said dog rotating on a shaft secured to the side walls of the housing, brackets and lugs for securing the housing on the bicycle frame, a cover for the housing, a narrow longitudinal slot in said cover for said dog to slide therein, bands secured on each side of said slot made of flexible material, all as described and illustrated.

ROGER BOUCHER.